(12) United States Patent
Kong et al.

(10) Patent No.: US 11,820,004 B2
(45) Date of Patent: Nov. 21, 2023

(54) TRANSPORTATION APPARATUS AND TRANSPORTATION ROBOT PROVIDED WITH TRANSPORTATION APPARATUS

(71) Applicant: HAI ROBOTICS CO., LTD., Shenzhen (CN)

(72) Inventors: Zhe Kong, Shenzhen (CN); Yeguang Chen, Shenzhen (CN); Qingxin Zhan, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 293 days.

(21) Appl. No.: 17/194,978

(22) Filed: Mar. 8, 2021

(65) Prior Publication Data

US 2021/0187760 A1     Jun. 24, 2021

Related U.S. Application Data

(63) Continuation of application No. PCT/CN2019/113369, filed on Oct. 25, 2019.

(30) Foreign Application Priority Data

Sep. 7, 2018   (CN) .......................... 201821469104.7

(51) Int. Cl.
*B25J 18/02*    (2006.01)
*B25J 5/00*     (2006.01)
(Continued)

(52) U.S. Cl.
CPC ............. *B25J 18/025* (2013.01); *B25J 5/007* (2013.01); *B25J 11/008* (2013.01);
(Continued)

(58) Field of Classification Search
None
See application file for complete search history.

(56) References Cited

U.S. PATENT DOCUMENTS

| | | | | |
|---|---|---|---|---|
| 4,516,476 A | * | 5/1985 | Beaton | .................. B25J 18/025 901/50 |
| 10,322,919 B2 | * | 6/2019 | Birkner | ............. H01L 21/67742 |

(Continued)

FOREIGN PATENT DOCUMENTS

| | | |
|---|---|---|
| CN | 106379681 A | 2/2017 |
| CN | 106429149 A | 2/2017 |

(Continued)

OTHER PUBLICATIONS

Machine translation of JPH07242306 from Espacenet. (Year: 1995).*

(Continued)

*Primary Examiner* — Mark C Hageman
(74) *Attorney, Agent, or Firm* — J.C. PATENTS

(57) ABSTRACT

A transportation apparatus (30), includes a bracket (31), a telescopic apparatus (32) and a manipulator (33), where the bracket is mounted to a storage shelf (20), the telescopic apparatus is mounted to the bracket, the manipulator is mounted to the telescopic apparatus, and the telescopic apparatus is used for driving the manipulator to move along a horizontal first reference line (S5) or a horizontal second reference line (S6). The manipulator is driven to move on the first reference line and second reference line that are disposed orthogonally, and thereby the manipulator is able to load or unload goods at any position on the first reference line or second reference line, so as to avoid time being wasted on adjusting an angle of a transportation robot (100). The transportation apparatus has a high transportation efficiency.

17 Claims, 11 Drawing Sheets

(51) Int. Cl.
*B25J 11/00* (2006.01)
*B25J 19/00* (2006.01)
*B66F 9/07* (2006.01)
*B66F 9/10* (2006.01)
*B66F 9/20* (2006.01)

(52) U.S. Cl.
CPC ............ *B25J 19/0041* (2013.01); *B66F 9/07* (2013.01); *B66F 9/10* (2013.01); *B66F 9/20* (2013.01)

(56) References Cited

U.S. PATENT DOCUMENTS

| | | | | |
|---|---|---|---|---|
| 10,654,174 | B2* | 5/2020 | Eidelberg | B25J 15/0061 |
| 10,894,663 | B2* | 1/2021 | Kapust | B65G 1/0435 |
| 11,279,556 | B2* | 3/2022 | Klinge | B25J 15/00 |
| 11,370,107 | B2* | 6/2022 | Wu | B25J 9/162 |
| 11,420,338 | B2* | 8/2022 | Bondaryk | B25J 11/008 |
| 2006/0285947 | A1* | 12/2006 | Hansl | B65G 1/0407 414/277 |
| 2009/0136331 | A1* | 5/2009 | Muser | B66F 9/07 414/529 |
| 2010/0114363 | A1* | 5/2010 | Cardoni | B25J 9/1612 700/218 |
| 2018/0057283 | A1* | 3/2018 | Peters | G05D 1/0261 |

FOREIGN PATENT DOCUMENTS

| | | |
|---|---|---|
| CN | 107364678 A | 11/2017 |
| CN | 108122016 A | 6/2018 |
| CN | 109941653 A | 6/2019 |
| CN | 209160601 U | 7/2019 |
| CN | 209192821 U | 8/2019 |
| JP | H07242306 A | 9/1995 |
| KR | 20170106811 A | 9/2017 |
| WO | WO2018129738 A1 | 7/2018 |

OTHER PUBLICATIONS

International Search Report for PCT/CN2019/113369.
First Office Action of the parallel application KR0-2021-7010214.

* cited by examiner

US 11,820,004 B2

TRANSPORTATION APPARATUS AND TRANSPORTATION ROBOT PROVIDED WITH TRANSPORTATION APPARATUS

CROSS-REFERENCE TO RELATED APPLICATION

This application is a continuation of International Application No. PCT/CN2019/113369, filed on Oct. 25, 2019, which claims priority to Chinese Patent Application No. 201821469104.7, filed on Sep. 7, 2018, all of which are hereby incorporated by reference in their entireties.

TECHNICAL FIELD

The present application relates to the field of intelligent warehousing technology, and in particular to a transportation apparatus and a transportation robot provided with the transportation apparatus.

BACKGROUND

Intelligent warehousing is a link in a logistics process, the application of the intelligent warehousing ensures the speed and accuracy of data input in all links of goods warehouse management, ensuring that an enterprise can accurately grasp real data of stock in time, and reasonably maintaining and controlling the stock of the enterprise. Through scientific coding, it is also convenient to manage batches and shelf lives of stocked goods. Using a warehouse location management function of an SNHGES system, it is also abled to grasp current locations of all stocked goods in time, which is conducive to improve the efficiency of warehouse management.

A transportation robot plays an important role in the intelligent warehousing. The transportation robot transports goods through a manipulator. However, in a process of implementing the present application, the inventor found that a current manipulator moves in one direction, so it can only move the goods in one direction. When the manipulator needs to transport goods in other direction, it is needed to adjust an angle of the transportation robot relative to a shelf. This process costs a certain amount of time, resulting in low transportation efficiency of the manipulator.

SUMMARY

A main technical problem solved by embodiments of the present application is to provide a transportation robot, which is equipped with a storage shelf and can load a large number of goods.

In order to solve the above technical problem, the embodiments of the present application provide the following technical solutions:

in one aspect, there is provided a transportation apparatus, including a bracket, a telescopic apparatus, and a manipulator, where the telescopic apparatus is mounted to the bracket, the manipulator is mounted to the telescopic apparatus, and the telescopic apparatus is used for driving the manipulator to move along a horizontal first reference line or a horizontal second reference line; and the first reference line and the second reference line are set at a preset angle.

In some embodiments, the telescopic apparatus includes a first telescopic arm and a second telescopic arm; one end of the first telescopic arm is mounted to the bracket, one end of the second telescopic arm is mounted to the other end of the first telescopic arm, and the manipulator is mounted to the other end of the second telescopic arm; the one end of the first telescopic arm moves along the first reference line relative to the other end of the first telescopic arm; and the one end of the second telescopic arm moves along the second reference line relative to the other end of the second telescopic arm.

In some embodiments, the first telescopic arm includes a first lower fork component, a first upper fork, and a first telescopic driving component; the first lower fork component is fixedly mounted to the bracket, and a surface of the first lower fork component facing away from the bracket is provided with a first guide rail for guiding along the first reference line; the first upper fork is mounted to the first guide rail; and the first telescopic driving component is connected to the first upper fork and the first lower fork component, and the first telescopic driving component is used for driving the first upper fork to move along the first reference line relative to the first lower fork component.

In some embodiments, the first telescopic driving component includes a lead screw, a moving block, and a first telescopic driving apparatus; the lead screw is mounted to the first upper fork, the moving block is fixedly mounted to the first lower fork component, and the moving block is threadedly connected to the lead screw, and the first telescopic driving apparatus is connected to the lead screw; a center line of the lead screw is disposed in parallel to the first reference line; and the first telescopic driving apparatus is used for driving the lead screw to rotate around the center line relative to the first upper fork, so that the moving block moves along the first reference line relative to the first upper fork.

In some embodiments, the first telescopic driving component includes a synchronous belt, a synchronous drive pulley, a synchronous belt tensioning pulley, and a first telescoping driving apparatus; the synchronous drive pulley and the synchronous belt tensioning pulley are both mounted to the first upper fork, the synchronous belt is simultaneously sleeved on the synchronous drive pulley and the synchronous belt tensioning pulley, and the first lower fork component is fixedly connected to the synchronous belt, and the first telescopic driving apparatus is connected to the synchronous drive pulley; and the first telescopic driving apparatus is used for driving the synchronous drive pulley to rotate, so that the synchronous belt drives the first lower fork component to move along the first reference line relative to the first upper fork.

In some embodiments, the first lower fork component includes a first lower fork, a first middle fork, and a second telescopic driving component; the first lower fork is fixedly mounted to the first upper fork, and a surface of the first lower fork facing away from the first upper fork is provided with a second guide rail for guiding along the first reference line; the first middle fork is mounted to the second guide rail, and a surface of the first middle fork facing away from the first lower fork is provided with the first guide rail; and the second telescopic driving component is connected to the first middle fork and the first lower fork, and is used for driving the first lower fork to move along the first reference line relative to the first middle fork.

In some embodiments, the second telescopic driving component includes a movable pulley and a strop; the movable pulley is mounted to the first middle fork, and a middle part of the strop is bent and sleeved on the movable pulley, so that two ends of the strop are disposed oppositely to each other; one end of the strop is fixedly mounted to the first lower fork, the other end of the strop is fixedly mounted to the first upper fork; and when the first middle fork moves along the first reference line relative to the first lower fork at a first speed, the first upper fork moves along the first reference line relative to the first lower fork at a second speed, and the second speed is twice the first speed.

In some embodiments, the movable pulley is a flat belt pulley, and the strop is an open-loop flat belt.

In some embodiments, the first reference line and the second reference line are disposed orthogonally.

In some embodiments, the manipulator includes a temporary storage pallet; and the temporary storage pallet is used for placing goods.

In another aspect, there is provided a transportation robot, including the transportation apparatus described above.

In some embodiments, the transportation robot further includes a mobile chassis and a storage shelf; and the storage shelf is mounted to the mobile chassis, and the storage shelf is used for placing a number of goods.

In some embodiments, the transportation robot further includes a lifting component; the lifting component is mounted to the storage shelf, and the lifting component is connected to the bracket of the transportation apparatus; and the lifting component is used for driving the transportation apparatus to move along a vertical direction relative to the storage shelf.

In some embodiments, the storage shelf includes a plurality of storage pallets distributed along the vertical direction; each storage pallet is used for placing goods; and when the lifting component drives the manipulator to move relative to the storage shelf, to a corresponding storage pallet along the vertical direction, the manipulator loads goods to or unload goods from the corresponding storage pallet.

In some embodiments, the manipulator includes a temporary storage pallet; the temporary storage pallet is used for placing goods; each storage pallet includes two supporting portions; the two supporting portions are together used for supporting goods, the two supporting portions are provided with a gap therebetween, and the gap is configured to allow the temporary storage pallet to pass through along the vertical direction; when the temporary storage pallet on which the goods are placed descends along the vertical direction and passes through the gap, the goods are separated from the temporary storage pallet and supported on the two supporting portions; and when the temporary storage pallet rises along the vertical direction and passes through the gap between the two supporting portions on which the goods are placed, the goods are separated from the corresponding two supporting portions and supported on the temporary storage pallet.

Compared with the prior art, in the transportation apparatus provided by the embodiments of the present application, by driving the manipulator to move on the orthogonal first reference line and the second reference line, the manipulator can load and unload goods at any position on the first reference line or the second reference line, so as to avoid time being wasted on adjusting an angle of a transportation robot, thereby the transportation apparatus has a high transportation efficiency.

BRIEF DESCRIPTION OF DRAWINGS

One or more embodiments are exemplarily illustrated by figures in the corresponding drawings. These exemplarily illustrations do not constitute a limitation on the embodiments. Elements with the same reference numerals in the drawings are denote similar elements. Unless otherwise stated, the figures in the drawings do not constitute a scale limitation.

DESCRIPTION OF EMBODIMENTS

In order to facilitate the understanding of the present application, the present application will be described in more detail below in conjunction with the drawings and specific implementations. It should be noted that when an element is expressed as being "fixed" to another element, it may be directly placed on the another element, or there may be one or more elements therebetween. When an element is expressed as being "connected" to another, it may be directly connected to the another element, or there may be one or more intervening elements therebetween. The terms "vertical", "horizontal", "left", "right" and similar expressions used in this specification are for illustrative purposes only.

Unless otherwise defined, all technical and scientific terms used in this specification have the same meaning as commonly understood by those skilled in the technical field of the present application. The terms used in the specification of the present application are only for the purpose of describing specific implementations rather than limiting the present application. The term "and/or" used in this specification includes any and all combinations of one or more related listed items.

Figure 1:
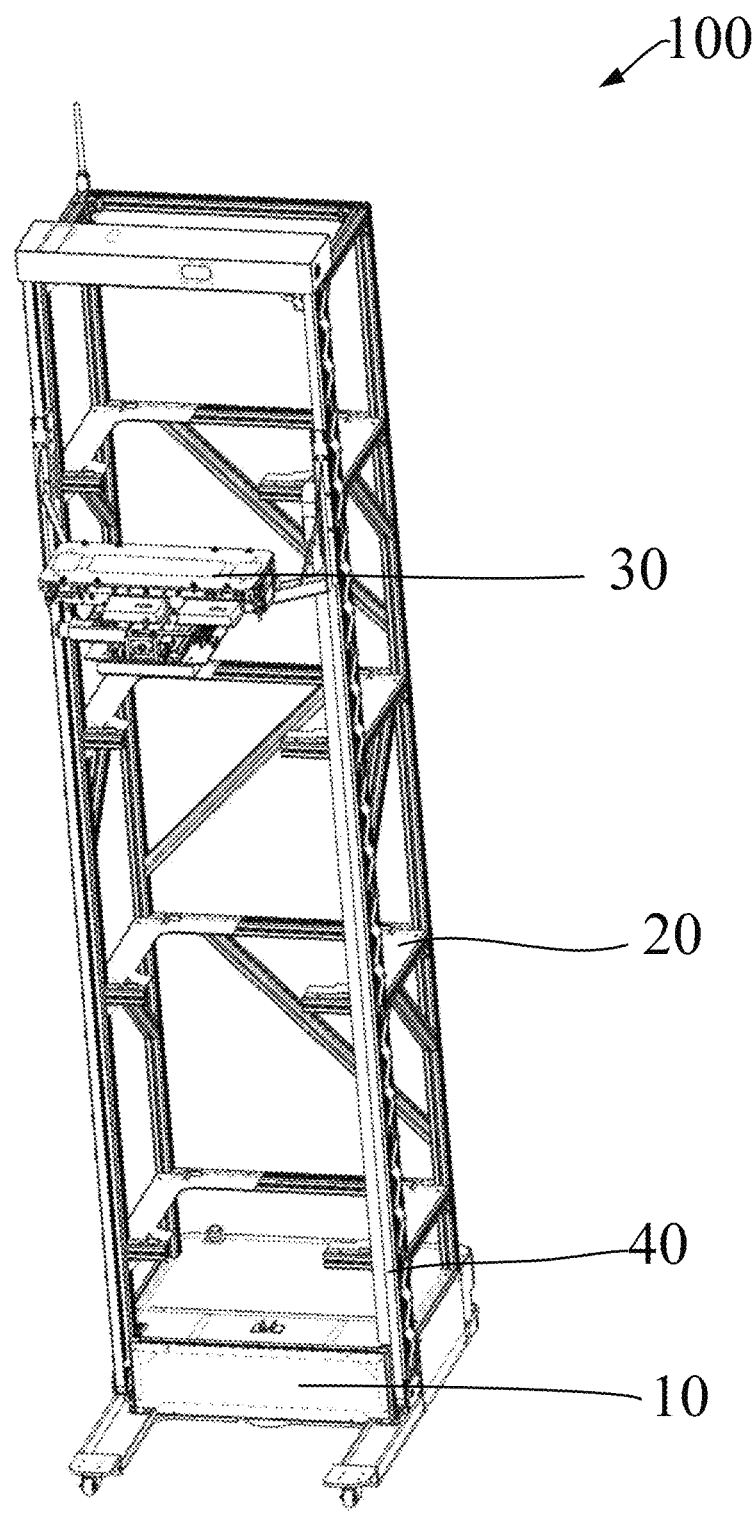
FIG. 1 is a schematic structural diagram of a transportation robot provided by an embodiment of the present application.
Figure 2:
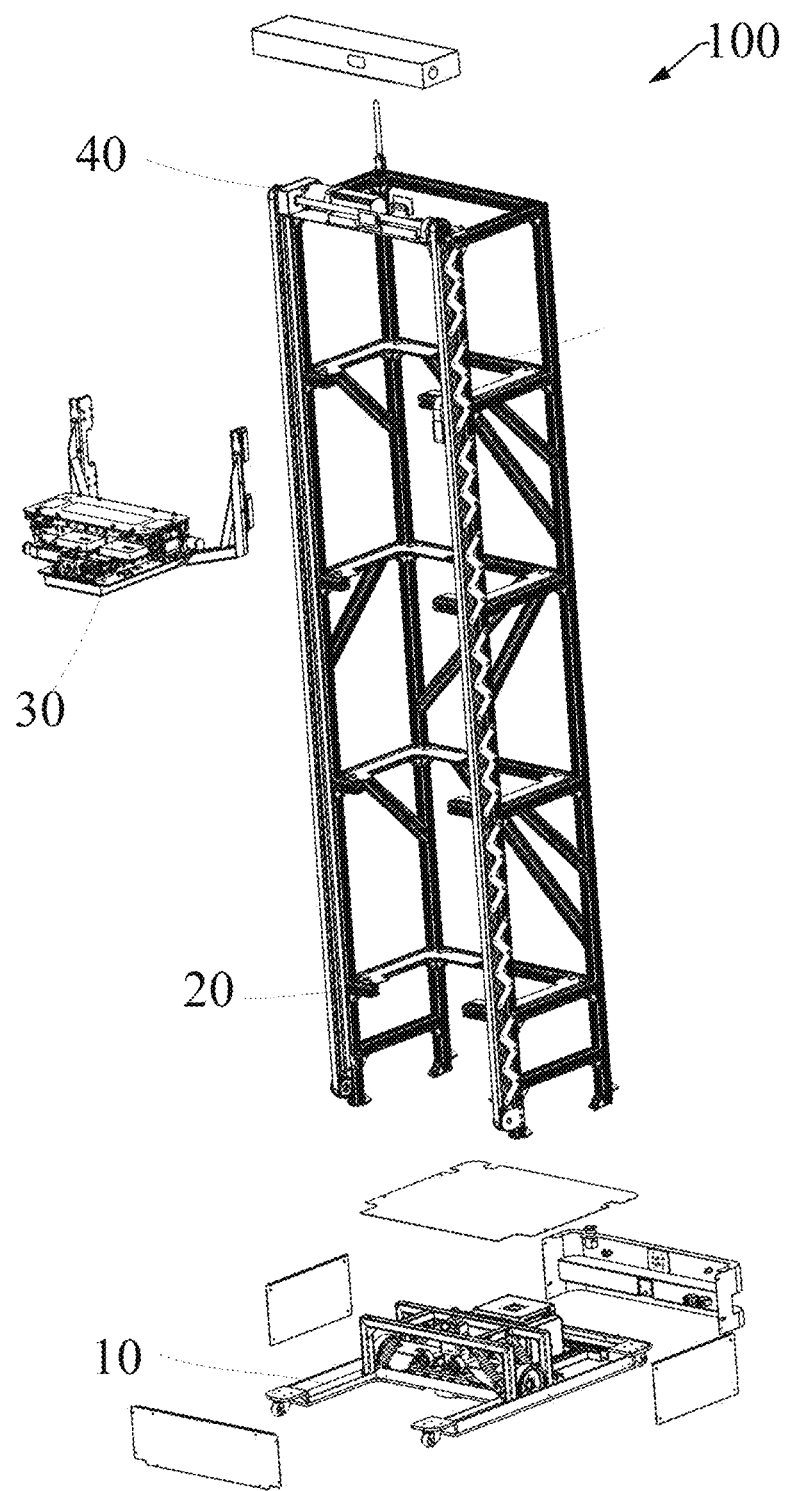
FIG. 2 is a schematic exploded diagram of the transportation robot shown in FIG. 1.

Please refer to FIG. 1 and FIG. 2, one of embodiments of the present application provides a transportation robot 100, the transportation robot 100 may be applied to intelligent warehousing systems, intelligent logistics systems, intelligent sorting systems, and the like, and in this embodiment, a transportation robot 100 applied to an intelligent warehousing system will be taken as an example for detailed description.

The intelligent warehousing system is provided with a fixed shelf, and the fixed shelf is provided with empty positions for placing goods.

It should be noted that the goods may be a single object, and may also be multiple objects.

The transportation robot 100 includes a mobile chassis 10, a storage shelf 20, a transportation apparatus 30, and a lifting component 40. Where, the storage shelf 20, the transportation apparatus 30, and the lifting component 40 are all mounted to the mobile chassis 10.

The mobile chassis 10 is used for implementing a mobile function of the transportation robot 100.

Figure 3:
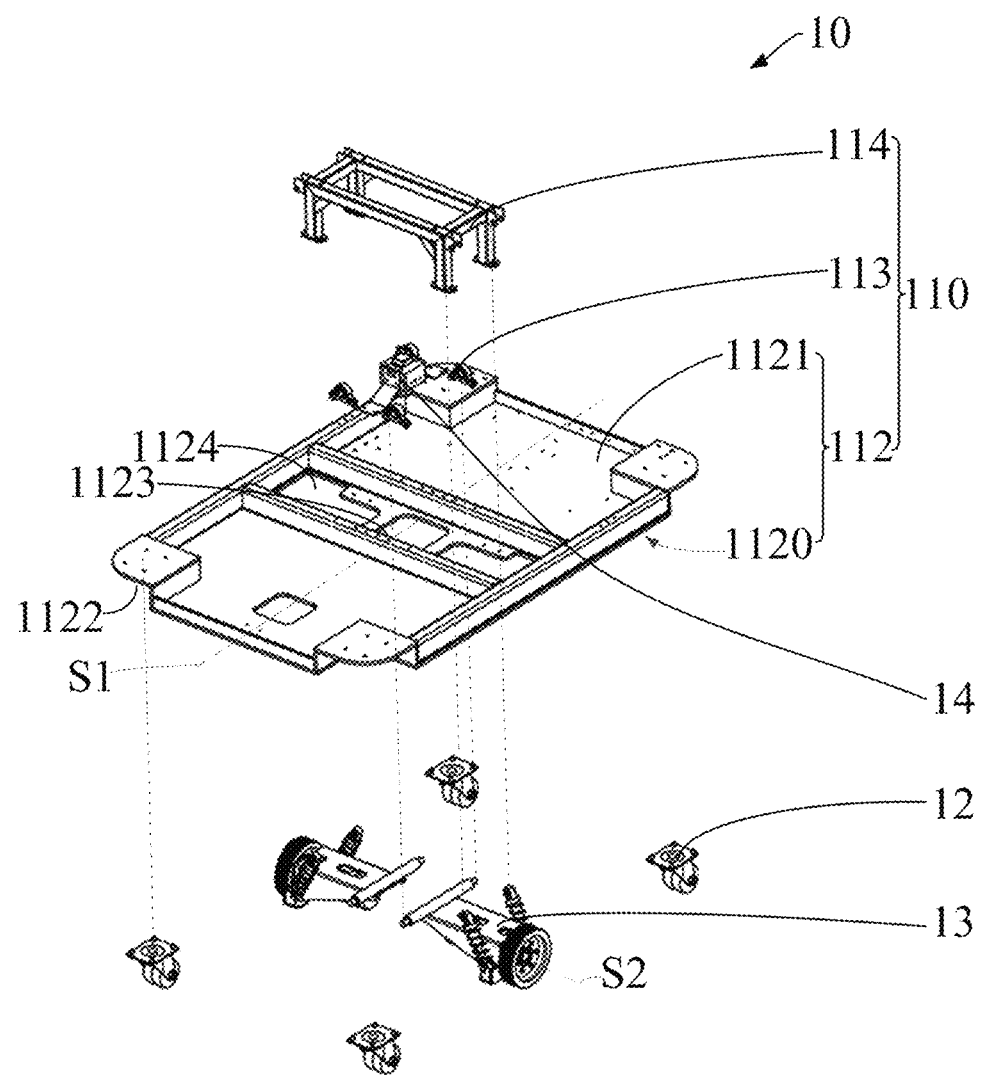
FIG. 3 is a schematic exploded diagram of a mobile chassis of the transportation robot shown in FIG. 2.

Please also refer to FIG. 3, the mobile chassis 10 includes a base 110, a driven wheel 12, a driving pulley component 13 and a guiding apparatus 14. Where, the driven wheel 12, the driving pulley component 13 and the guiding apparatus 14 are all mounted to the base 110.

The base 110 is assembled by welding steel beams, steel plates and skins. The base 110 includes a base body 112, an axle seat 113, and a shock absorber bracket 114. The axle seat 113 is mounted to the base body 112. The shock absorber bracket 114 is also mounted to the base body 112.

The base body 112 is a horizontally disposed rectangular plate and has a symmetry axis S1. The base body 112 includes a first surface 1120 and a second surface 1121 that are disposed oppositely.

The base body 112 is provided with a driven wheel mounting groove 1122, a driving wheel mounting port 1123, and a guiding apparatus mounting port 1124.

The driven wheel mounting groove 1122 is disposed on the first surface 1120 of the base body 112, and the driven wheel mounting groove 1122 is used for mounting the driven wheel 12.

The driving wheel mounting port 1123 is disposed to pass through the first surface 1120 and the second surface 1121 of the base body 112, and the driving wheel mounting port 1123 is used for placing the driving wheel component 13.

The guiding apparatus mounting port 1124 is disposed to pass through the first surface 1120 and the second surface 1121 of the base body 112, and the guiding apparatus mounting port 1124 is used for mounting the guiding apparatus 14.

The axle seat 113 and the shock absorber bracket 114 are both mounted to the second surface 1121 of the base body 112, and the axle seat 113 and the shock absorber bracket 114 are together used for mounting the driving wheel component 13.

It is worth noting that, by providing with the driven wheel mounting groove 1122 for mounting the driven wheel 12, and the driving wheel mounting port 1123 for placing the driving wheel component 13, a ground clearance and a height of center of mass of the mobile chassis 10 can be controlled, so that a ground gripping force of the mobile chassis 10 is improved, and the stability of the mobile chassis 10 is improved.

Four driven wheels 12 are distributed in a first rectangle, and one of symmetry axes of the first rectangle coincides with the symmetry axis S1, and the four driven wheels 12 support the base 110.

It can be understood that, according to actual conditions, the number of the driven wheel 12 is not limited to four. For example, the number of the driven wheel 12 may also be three, or more than four, as long as there are at least three.

In this embodiment, the driven wheel 12 is a universal wheel.

It can be understood that, according to actual conditions, the driven wheel 12 is not limited to the universal wheel. For example, the driven wheel 12 may also be a wheel body with a steering bracket (refer to a rear wheel set of an automobile), as long as the driven wheel 12 has a steering function.

The driving wheel component 13 is used for driving the mobile chassis 10 to move, the driving wheel component 13 is mounted to the base 110, and two driving wheel components 13 are symmetrically distributed relative to the symmetry axis S1, and any one of the driving wheel components 13 is located between the two driven wheels 12.

Figure 4:
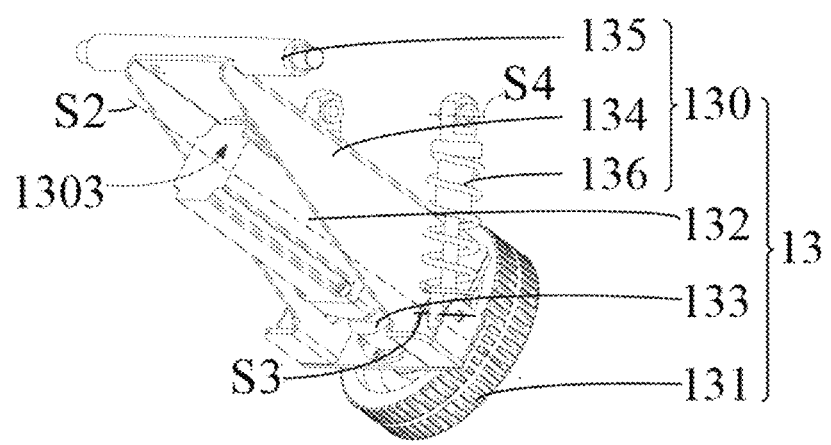
FIG. 4 is a schematic structural diagram of a driving wheel component of the mobile chassis shown in FIG. 3.

Please also refer to FIG. 4, each driving wheel component 13 includes a driving wheel bracket 130, a driving wheel body 131, a hub driving apparatus 132, and a hub speed deceleration apparatus 133. Where, the driving wheel body 131 is mounted to the driving wheel bracket 130, and the driving wheel body 131 may rotate around a rotation axis S2 relative to the driving wheel bracket 130, and the rotation axis S2 is horizontal and perpendicular to the symmetry axis S1, which makes the mobile chassis 10 movable. An output end of the hub driving apparatus 132 is connected to an input end of the hub speed deceleration apparatus 133, and an output end of the hub speed deceleration apparatus 133 is flange-connected to the driving wheel body 131. The hub driving apparatus 132 is used for providing a first driving force for allowing the driving wheel body 131 to rotate around the rotation axis S2, and the hub speed deceleration apparatus 133 is used for transmitting the first driving force.

It can be understood that, according to actual conditions, the hub speed deceleration apparatus 133 may be omitted. In some embodiments, the output end of the hub driving apparatus 132 is directly flange-connected to the driving wheel body 131, so that the driving wheel body 131 can rotate around the rotation axis S2.

It is worth noting that, the output end of the hub speed deceleration apparatus 133 or the output end of the hub driving apparatus 132 is flange-connected to the driving wheel body 131, which can improve the reliability of connection of the driving wheel body 131, thereby the driving wheel body 131 can be mounted firmly and is not easy to detach.

Through independent driving control of the hub driving apparatus 132 of the two driving wheel components 13, rotation speeds of two driving wheel bodies 131 may be different, so that the mobile chassis 10 turns toward the driving wheel body 131 with a lower rotation speed, to realize a turning function of the mobile chassis 10.

Further, the driving wheel bracket 130 includes a hub bracket 134, a shaft 135, and a shock absorber 136. Where, one end of the driving wheel bracket 130 is disposed close to the symmetry axis S1, and the other end is disposed away from the symmetry axis S1, and the driving wheel body 131 is mounted at an end of the hub bracket 134 away from the symmetry axis S1. The shaft 135 is connected to the hub bracket 134, and the shaft 135 is disposed parallel to the symmetry axis S1, and the shaft 135 is mounted to the axis seat 113, so that the driving wheel component 13 can rotate around the shaft 135 relative to the base body 112. One end of the shock absorber 136 is hinged to one end of the shock absorber bracket 114 facing away from the base body 112, so that the shock absorber 136 can rotate relative to the base body 112 around a first axis S3 parallel to the shaft 135; the other end of the shock absorber 136 is hinged to one end of the hub bracket 134 facing away from the shaft 135, so that the shock absorber 136 can rotate relative to the hub bracket 134 around a second axis parallel to the shaft 135. The shock absorber bracket 114, the hub bracket 134, and the shock absorber 136 form a triangular structure, and when the mobile chassis 10 turns, the shock absorber 136 can buffer part of an eccentric force, which further improves the movement stability of the mobile chassis 10.

In this embodiment, the hub driving apparatus 132 is a first motor.

It can be understood that, according to actual conditions, the hub driving apparatus 132 is not limited to the first motor. For example, the hub driving apparatus 132 may also be a pneumatic motor, a hydraulic transmission system, or the like.

The guiding apparatus 14 is mounted to the second surface 1121 of the base body 131 through a guiding apparatus bracket. In this embodiment, the guiding apparatus 14 is a first camera, and lens of the first camera is directly facing the guiding apparatus mounting port 1124, and is used for identifying two-dimensional codes attached to ground, so that the mobile chassis 10 goes forward along a preset path.

It can be understood that, according to actual conditions, the guiding apparatus 14 is not limited to be in the form of the first camera. For example, the guiding apparatus 14 may be a laser guiding apparatus that goes forward along a laser beam. For another example, the guiding apparatus 14 is a shortwave receiving apparatus, which realizes a guiding function by receiving a specific shortwave signal, or the like.

Figure 5:
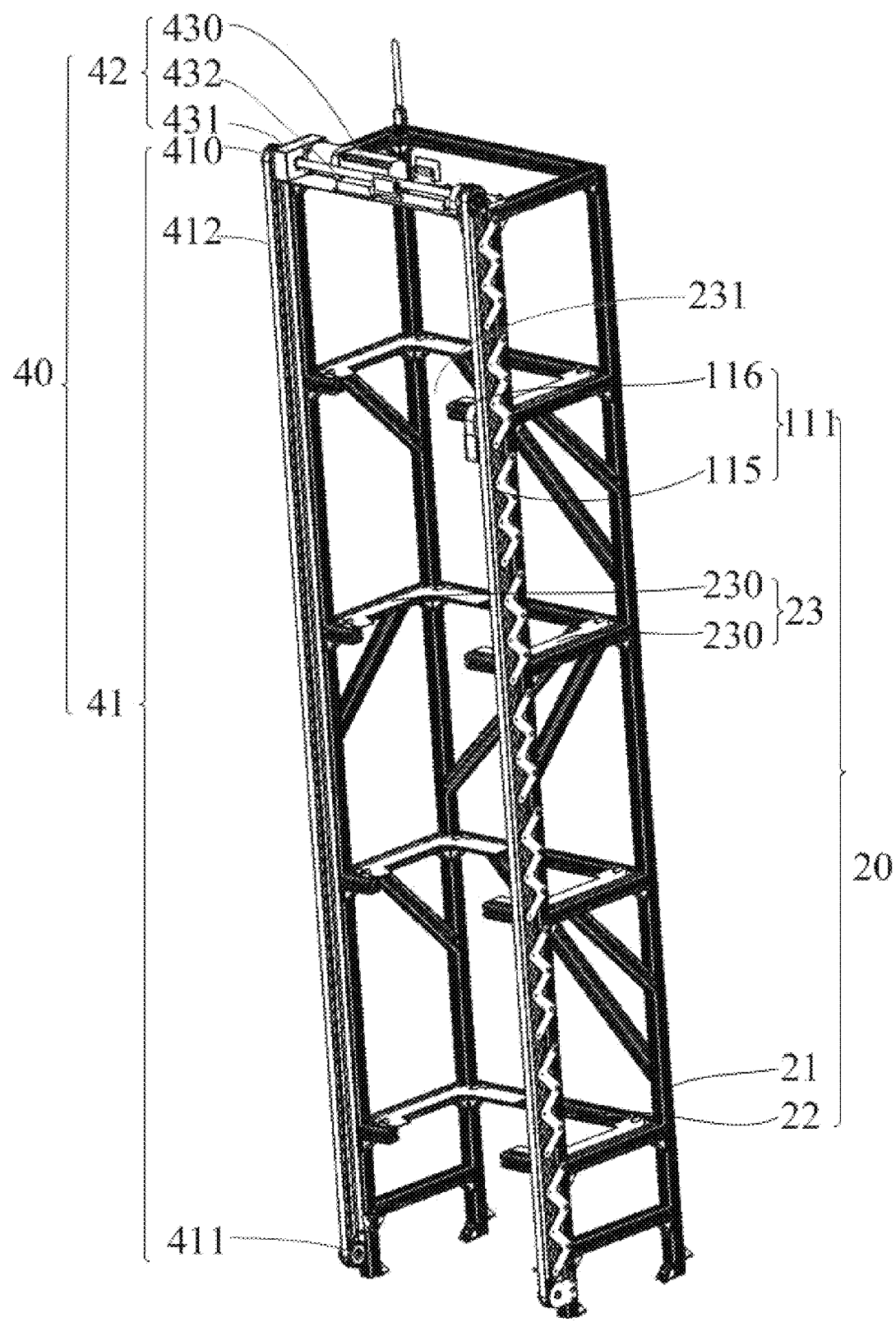
FIG. 5 is a schematic structural diagram of a storage shelf and a lifting component of the mobile chassis shown in FIG. 3.

Please also refer to FIG. 5, the storage shelf 20 includes a vertical bracket 111.

The vertical bracket 111 is mounted to the second surface 1121 of the base body 112, and the vertical bracket 111 includes a vertical column 115 and a horizontal column 116 that is mounted to the vertical column 115.

The vertical column 115 is vertically disposed and mounted to the second surface 1121 of the base body 112, and two vertical columns are symmetrically distributed relative to the symmetry axis S1.

A surface of each vertical column 115 facing another vertical column 115 is provided with a guide rail for vertically guiding, and the transportation apparatus 30 is mounted to guide rails of two vertical columns 115, so that the transportation apparatus 30 can move along a vertical direction relative to the vertical columns 115.

It can be understood that, according to actual conditions, the number of the guide rail is not limited to two. For example, the number of the guide rail may be one, three or more than three, as long as there is at least one.

The horizontal column 116 is disposed horizontally and connected between the two vertical columns 115, and a plurality of the horizontal columns 116 are distributed along the vertical direction.

The storage shelf 20 further includes a vertical rod 21, a horizontal rod 22 and a storage pallet 23. Where, the vertical rod 21 is disposed vertically and mounted to the second surface 1121 of the base body 112, and two vertical rods 21 are symmetrically distributed relative to the symmetry axis S1. The horizontal rod 22 are disposed horizontally and connected between the two vertical rods 21. Both the number of the horizontal rod 22 and the number of the storage pallet 23 correspond to the number of the horizontal column 116, one horizontal rod 22 and one corresponding horizontal column 116 together support one corresponding storage pallet 23, and each storage pallet 23 is used for placing goods.

Each storage pallet 23 includes two supporting portions 230.

The two supporting portions 230 are symmetrically distributed relative to the symmetry axis S1, the two supporting portions 230 are together used for supporting one piece of goods, and a gap 231 is disposed between the two supporting portions 230.

Figure 6:
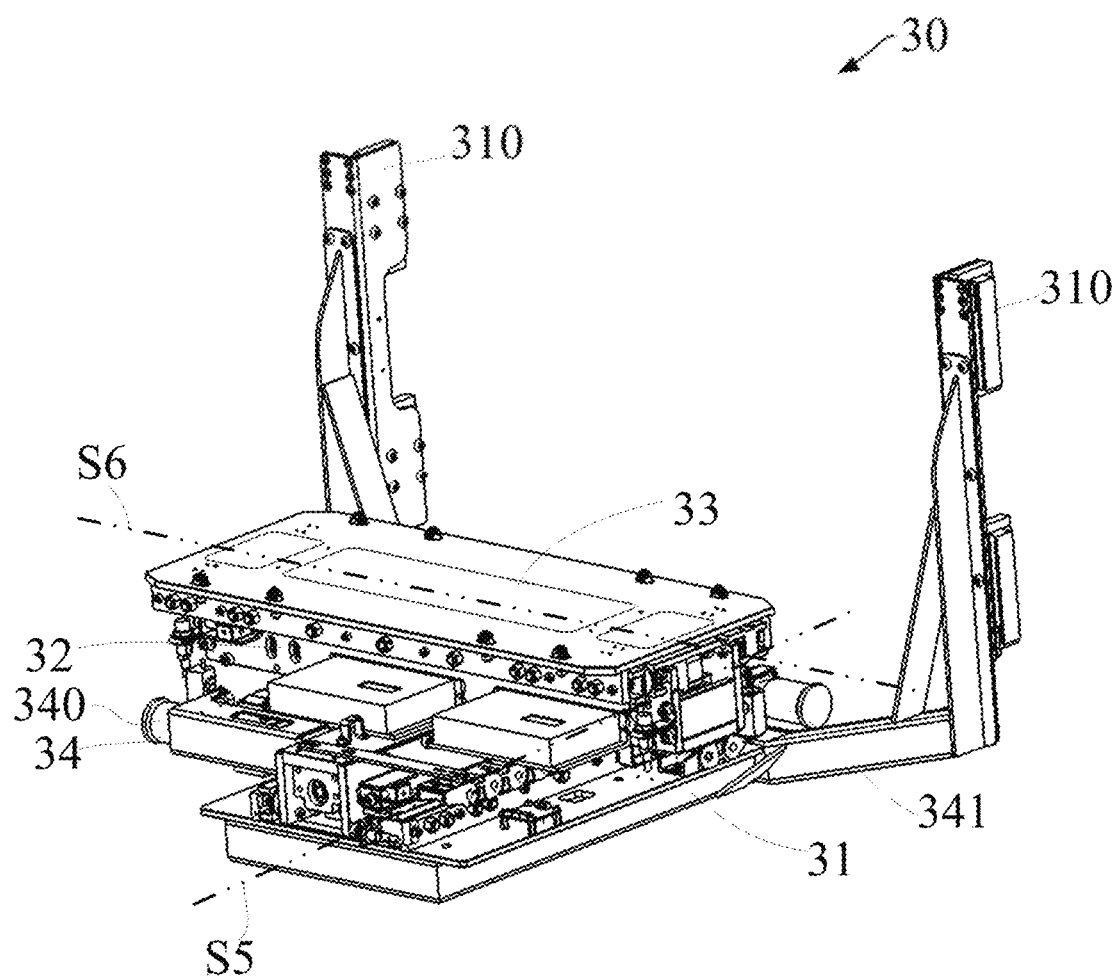
FIG. 6 is a schematic structural diagram of a transportation apparatus of the transportation robot shown in FIG. 2.
Figure 7:
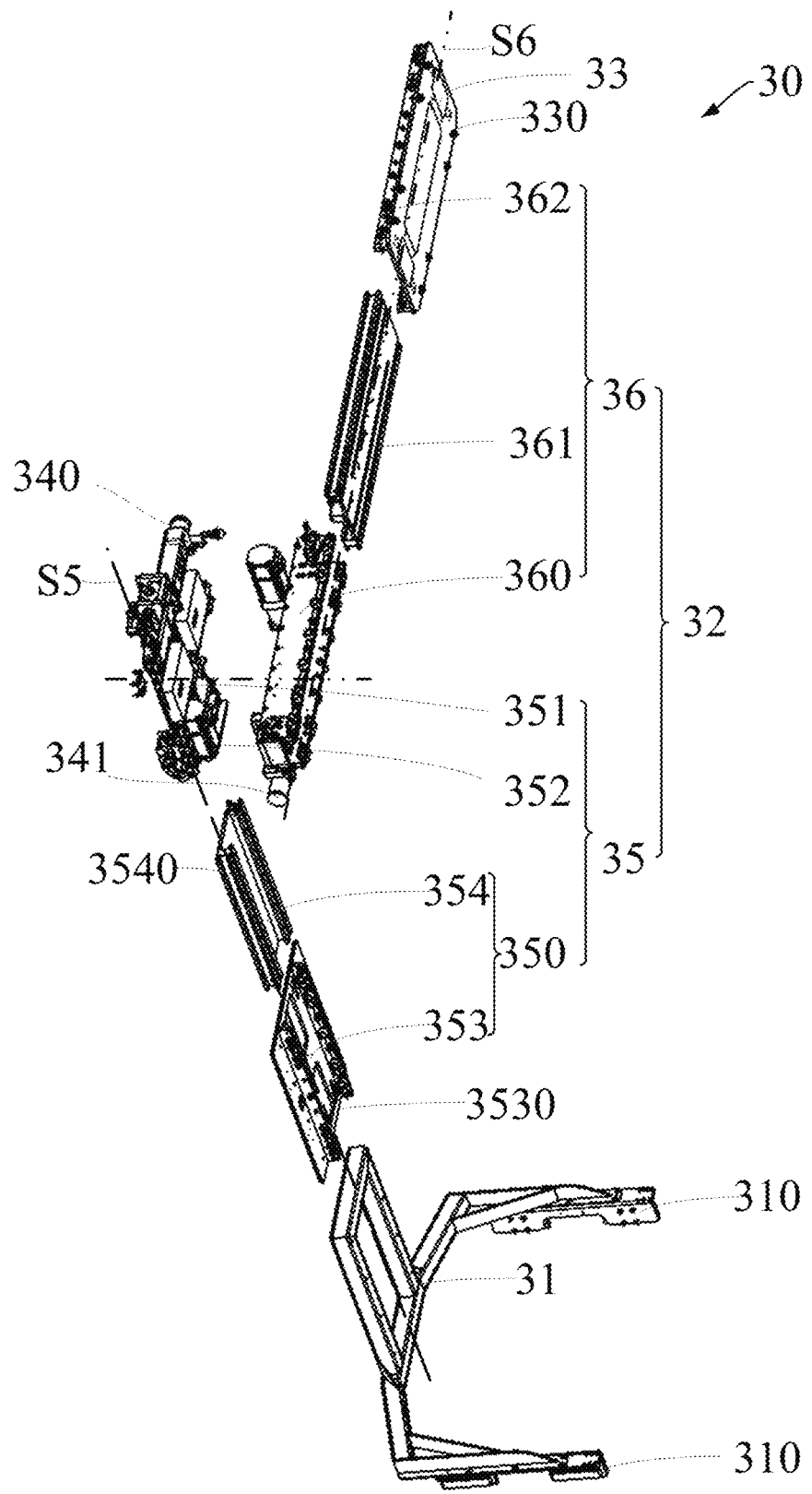
FIG. 7 is a schematic exploded diagram of the transportation apparatus shown in FIG. 6.
Figure 8:
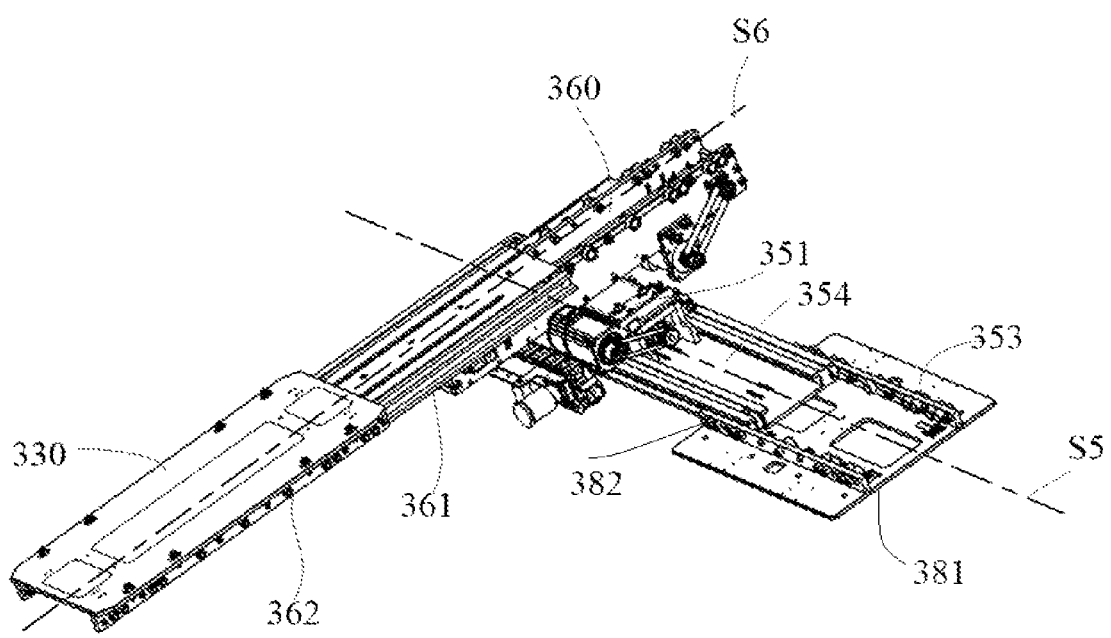
FIG. 8 is a schematic diagram of movement of the transportation apparatus shown in FIG. 6.

Please also refer to FIG. 6 to FIG. 8, the transportation apparatus 30 is used for transporting goods between the storage shelf 20 and the fixed shelf.

The transportation apparatus 30 includes a bracket 31, a telescopic apparatus 32, a manipulator 33, and a positioning component 34. The telescopic apparatus 32 is mounted to the bracket 31, the manipulator 33 is mounted to the telescopic apparatus 32, and the positioning component 34 is mounted to the telescopic apparatus 32.

The bracket 31 is assembled by welding steel beams and has a substantially horizontal plate-like structure. Two ends of one side part of the bracket 31 facing the vertical bracket 111 is respectively provided with a sliding block 310 (i.e., having two sliding blocks in total) and the two sliding blocks 310 are respectively mounted to a corresponding guide rail, so that the bracket 31 can move along the vertical direction relative to the vertical bracket 111.

The telescopic apparatus 32 is mounted to a surface of the bracket 31 facing away from the base 110, and the telescopic apparatus 32 is used for driving the manipulator 33 to move toward a horizontal first reference line S5 or a horizontal second reference line S6 relative to the bracket 31, the first reference line S5 is disposed parallel to the symmetry axis S1, and the first reference line S5 and the second reference line S6 are set at a preset angle.

In this embodiment, the first reference line S5 and the second reference line S6 are disposed orthogonally.

It can be understood that, according to actual conditions, the first reference line S5 and the second reference line S6 are not limited to an orthogonal form, as long as the first reference line S5 and the second reference line S6 are not parallel to each other.

The telescopic apparatus 32 includes a first telescopic arm 35 and a second telescopic arm 36 that is mounted to the first telescopic arm 35.

One end of the first telescopic arm 35 is fixedly mounted to the surface of the bracket 31 facing away from the base, the other end of the first telescopic arm 35 is mounted with the second telescopic arm 36, and one end of the first telescopic arm 35 can move along the first reference line S5 relative to the other end.

The first telescopic arm 35 includes a first lower fork component 350, a first upper fork 351, and a first telescopic driving component 352. Where, the first upper fork 351 is mounted to the first lower fork component 350, the first telescopic driving component 352 is connected to the first upper fork 351 and the first lower fork component 350 respectively, and the telescopic driving component 352 is used for driving the first upper fork 351 to move along the first reference line S5 relative to the first lower fork component 350.

The first lower fork component 350 includes a first lower fork 353, a first middle fork 354 and a second telescopic driving component 355. Where, the first middle fork 354 is mounted to the first lower fork 353, the second telescopic driving component 355 is respectively connected to the first lower fork 353 and the first middle fork 354, and the second telescopic driving component 355 is used for driving the first middle fork 354 to move along the first reference line S5 relative to the first lower fork 353.

The first lower fork 353 is substantially a horizontal flat plate structure, the first lower fork 353 is fixedly mounted to the surface of the bracket 31 facing away from the base 110, and a surface of the first lower fork 353 facing away from the bracket 110 is provided with a second guide rail 3530 for guiding along the first reference line S5.

Figure 9:
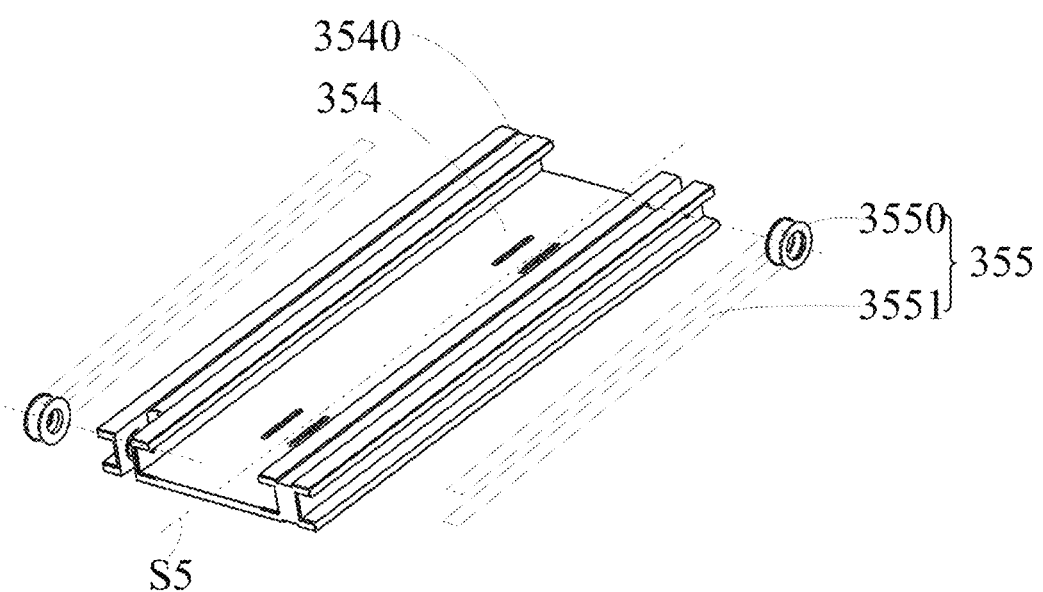
FIG. 9 is a schematic structural diagram of a first middle fork and a second telescopic driving component of the transportation apparatus shown in FIG. 7.

Please also refer to FIG. 9, the first middle fork 354 is a substantially horizontal flat plate structure, and the first middle fork 354 is mounted to the second guide rail 3530, so that the first middle fork 354 can move along the first reference line S5 relative to the first lower fork 353, and a surface of the first middle fork 354 facing away from the first lower fork 353 is provided with a first guide rail 3540 for guiding along the first reference line S5.

The second telescopic driving component 355 is also connected to the first upper fork 351, and the second telescopic driving component 355 includes a movable pulley 3550 and a strop 3551. Where, the strop 3551 is connected to the movable pulley 3550.

The movable pulley 3550 is mounted to the first middle fork 354.

A middle part of the strop 3551 is bent and sleeved on the movable pulley 3550, so that two ends of the strop 3551 are disposed oppositely to each other, and the two ends of the strop 3551 are disposed parallel to the first reference line S5, one end of the strop 3551 is fixedly mounted to the first upper fork 351, and the other end of the strop 3551 is fixedly mounted to the first lower fork 353. The strop 3551 and the movable pulley 3550 form a movable pulley mechanism, and when one end of the strop 3551 moves relative to the first middle fork 354 along the first reference line S5 at a first speed in a positive direction, the other end of the strop 3551 moves relative to the first middle fork 354 along the first reference line S5 at the first speed in an opposite direction, that is, one end of the strop 3551 moves relative to the other end of the strop 3551 at a second speed, and the second speed is twice the first speed.

When the first middle fork 354 moves along the first reference line S5 relative to the first lower fork 353 at the first speed, the first upper fork 351 moves along the first reference line S5 relative to the first lower fork 353 at the second speed.

In this embodiment, the movable pulley 3550 is a flat pulley, and the strop 3551 is an open-loop flat belt.

It can be understood that, according to actual conditions, the movable pulley 3550 is not limited to the flat pulley, and the strop 3551 is not limited to the open-loop flat belt. For example, the movable pulley 3550 and the strop 3551 are sprocket and pitch chain, respectively. For another example, the movable pulley 3550 and the strop 3551 are respectively V belt pulley and V belt, or the like.

The first upper fork 351 is a substantially horizontal flat plate structure, and the first upper fork 351 is mounted to the first guide rail 3540, so that the first upper fork 351 can move along the first reference line S5 relative to the first middle fork 354.

The first telescopic driving component 352 includes a first telescopic transmission mechanism 356 and a first telescopic driving mechanism 357. The first telescopic transmission mechanism 356 is connected to the first telescopic driving mechanism 357, the first telescopic transmission mechanism 356 is connected to the first upper fork 351 and the first middle fork 354, and the first telescopic driving mechanism 356 is used for driving, by the first telescopic transmission mechanism 356, the first upper fork 351 to move along the first reference line S5 relative to the first middle fork 354.

Figure 10:
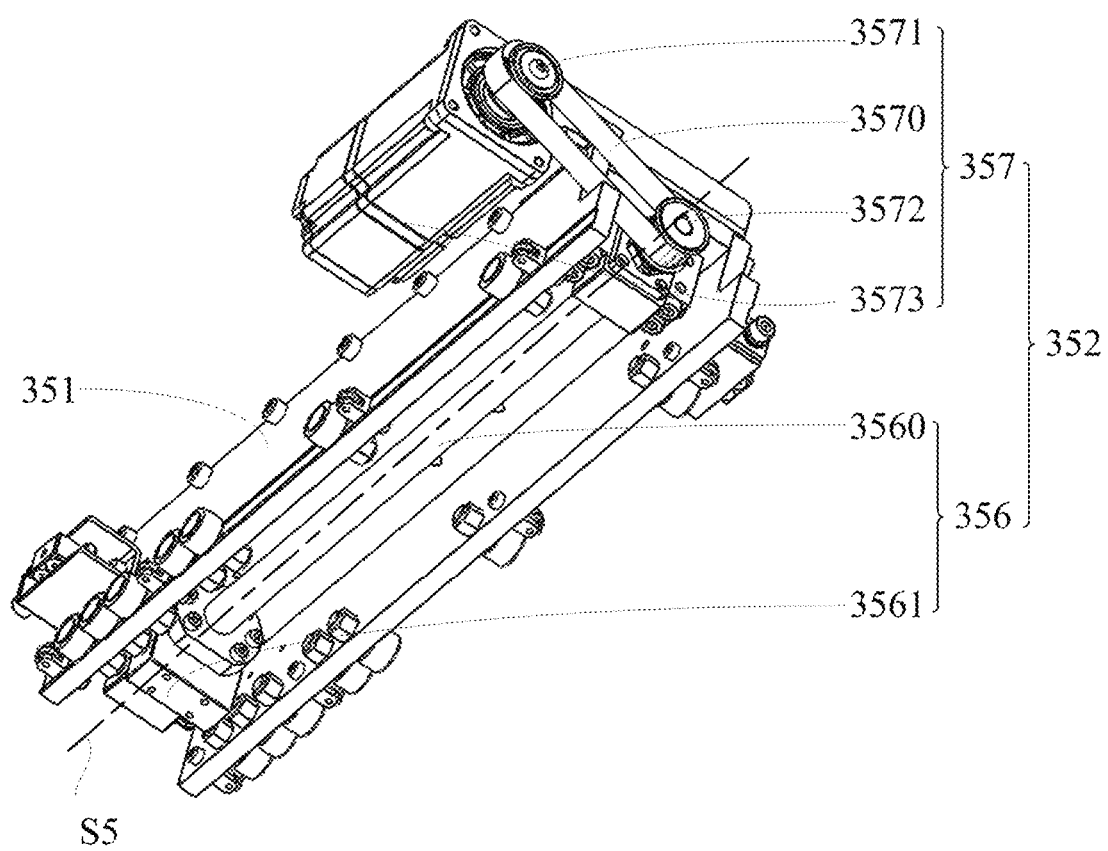
FIG. 10 is a schematic structural diagram of a first upper fork and a first telescopic driving component of the transportation apparatus shown in FIG. 7.

Please also refer to FIG. 10, the first telescopic transmission mechanism 356 includes a lead screw 3560 and a moving block 3561. Where, the lead screw 3560 is threadedly connected to the moving block 3561.

Two ends of the lead screw 3560 are both mounted to a surface of the first upper fork 351 facing the first middle fork 354, a center line of the lead screw 3560 is parallel to the first reference line S5, and the first lead screw 3560 can rotate around the center line relative to the first upper fork 351. The first telescopic driving mechanism 357 is connected to one end of the lead screw 3560, and the first telescopic driving mechanism 357 is used for driving the lead screw 3560 to rotate around the center line.

The moving block 3561 is fixedly mounted to a surface of the first middle fork 354 facing the first upper fork 351. When the lead screw 3560 rotates around the center line relative to the first upper fork 351, the lead screw 3560 can drive the moving block 3561 to move along the center line, so that the first middle fork 354 connected to the moving block 3561 can move along the first reference line S5 relative to the first upper fork 351.

It can be understood that, according to actual conditions, the first telescopic transmission mechanism 356 is not limited to be in the form of the lead screw 3560 and the moving block 3561. For example, the first telescopic transmission mechanism 356 may also be a gear set. For another example, the first telescopic transmission mechanism 356 may also be a worm gear mechanism, or the like.

The first telescopic driving mechanism 357 includes a first V belt 3570, a first drive V belt pulley 3571, a first driven V belt pulley 3572, and a first telescopic driving apparatus 3573. Where, the first V belt 3570 is simultaneously sleeved on the first drive V belt pulley 3571 and the first driven V belt pulley 3572, and the first telescopic driving apparatus 3573 is connected to the first drive V belt pulley 3571, the first driven V belt pulley 3572 is fixedly connected to one end of the lead screw 3560, and the first telescopic driving apparatus 3572 is used for driving the first drive V belt pulley 3571 to rotate, and driving, by the first V belt 3570, the first driven V belt pulley 3572 to rotate, so that the lead screw 3560 rotates around the center line relative to the first upper fork 351.

In this embodiment, the first telescopic driving apparatus 3573 is a second motor.

It can be understood that, according to actual conditions, the first telescopic driving apparatus 3573 is not limited to the second motor. For example, the first telescopic driving apparatus is a pneumatic motor. For another example, the first telescopic driving apparatus is a hydraulic power system, or the like.

It can be understood that, according to actual conditions, the first V belt 3570, the first drive V belt pulley 3571, and the first driven V belt pulley 3572 may be omitted. In some embodiments, the first telescopic driving apparatus 3573 is directly connected to the one end of the lead screw 3560 so as to drive the lead screw 3560 to rotate around the center line relative to the first upper fork 351.

It can be understood that, according to actual conditions, the first middle fork 354 and the second telescopic driving component 355 may be omitted, the first upper fork 351 is directly mounted to the first lower fork 353, and the first telescopic driving component 352 is directly connected to the first upper fork 351 and the first lower fork 353.

Figure 11:
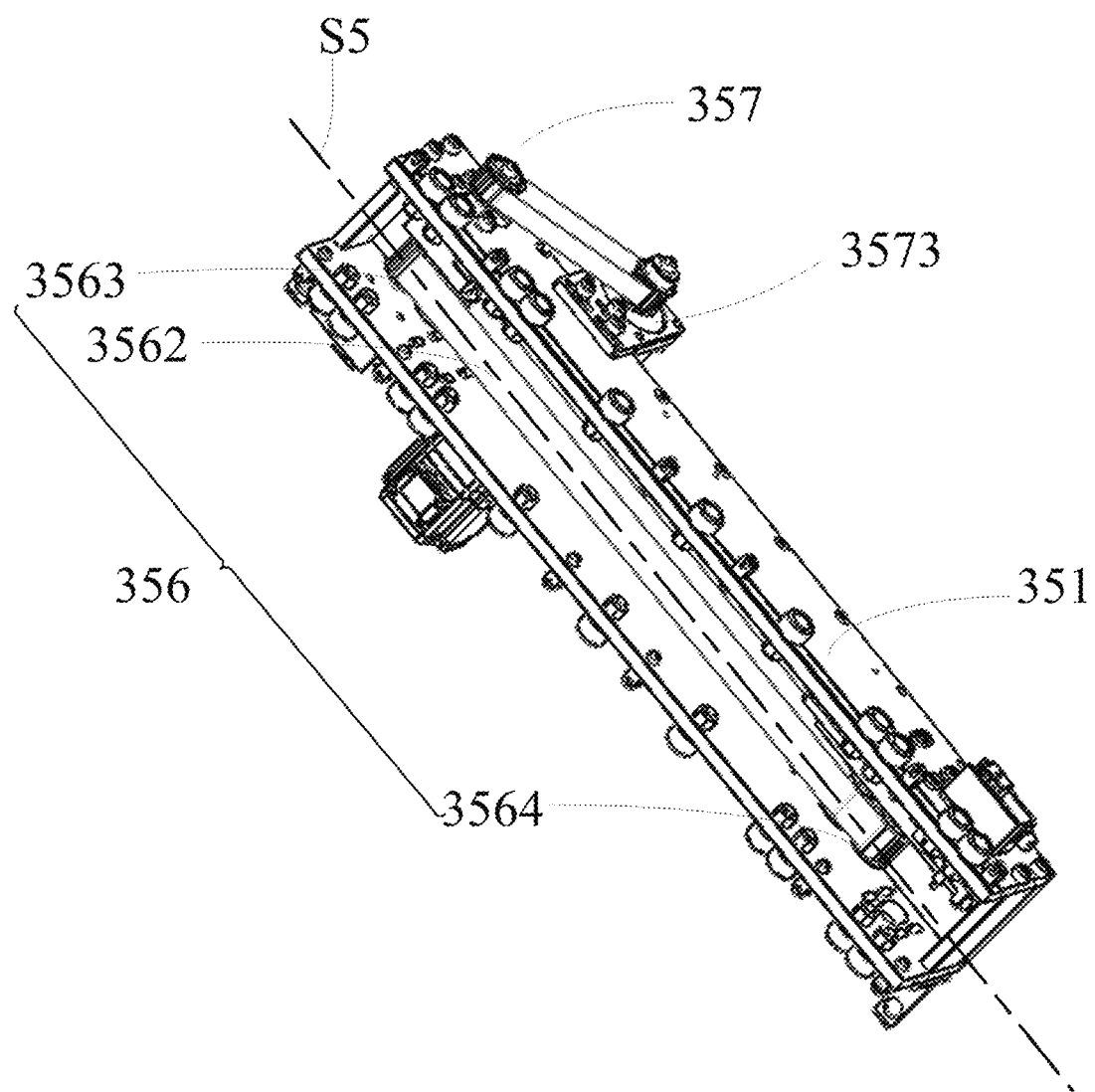
FIG. 11 is a schematic structural diagram of another implementation manner of a first telescopic transmission mechanism of the first telescopic driving component shown in FIG. 10.

Please also refer to FIG. 11. In some embodiments, the first telescopic driving mechanism 356 includes a synchronous belt 3562, a synchronous drive pulley 3563, and a synchronous belt tensioning pulley 3564.

The synchronous drive pulley 3563 and the synchronous belt tensioning pulley 3564 are both mounted to the first upper fork 351, and the synchronous belt 3562 is simultaneously sleeved on the synchronous drive pulley 3563 and the synchronous belt tensioning pulley 3564, and the first lower fork component 350 is fixedly connected to the synchronous belt 3562, the first telescopic driving mechanism 357 is connected to the synchronous drive pulley 3563 to drive the synchronous drive pulley 3563 to rotate, so that the synchronous belt 3562 drives the first lower fork component 350 to move along the first reference line S5 relative to the first upper fork 351.

One end of the second telescopic arm 36 is fixedly mounted to a surface of the first upper fork 351 facing away from the first middle fork 354, the other end of the second telescopic arm 36 is mounted with the manipulator 33, and one end of the second telescopic arm 36 can move along the second reference line S6 relative to the other end.

The second telescopic arm 36 includes a second lower fork 360, a second middle fork 361, and a second upper fork 362. Where, the second lower fork 360 is fixedly mounted to the surface of the first upper fork 351 facing away from the first middle fork 354, the second middle fork 361 is mounted to a surface of the second lower fork 360 facing away from the first upper fork 351, the second upper fork 362 is mounted to a surface of the second middle fork 361 facing away from the second lower fork 360, and the second middle fork 361 can move along the second reference line S6 relative to the second lower fork 360, the second upper fork 362 can move along the second reference line S6 relative to the second middle fork 361. Since the structure of the second telescopic arm 36 is basically similar to the structure of the first telescopic arm 35, and components of the first telescopic arm 35 and components of the second telescopic arm 36 are interchangeable, and thus the description will not be repeated here. In an embodiment, the first lower fork 353 includes a first end 381 and a second end 382 opposite to each other along the first reference line S5, and when the first telescopic arm 35 and the second telescopic arm 36 are retracted, the second lower fork 360 is disposed between and above the first end 381 and the second end 382 of the first lower fork 353.

The manipulator 33 is mounted to a surface of the second upper fork 362 facing away from the second middle fork 361, the manipulator 33 is used for loading or unloading goods, and the manipulator 33 includes a temporary storage pallet 330, where the temporary storage pallet 330 is used for placing goods, and the temporary storage pallet 330 is configured to pass through a gap 231 of any storage pallet 23 along a vertical direction.

A surface of the temporary storage pallet 330, for placing goods, is provided with a first supporting portion 331 and a second supporting portion 332. The first supporting portion 331 and the second supporting portion 332 are together used for supporting goods placed on the temporary storage pallet 330.

The first supporting portion is a first pulley, the first pulley 331 can rotate around an axis parallel to the second reference line S6, and the second supporting portion is a second pulley, the second pulley 332 can rotate around an axis parallel to the first reference line S5.

The number of the first pulley 331 is four, and such four first pulleys 331 are distributed in a first rectangle, and two symmetry lines of the first rectangle are parallel to the first reference line S5 and the second reference line S6, respectively.

The number of the second pulley 332 is four, and such four second pulleys 332 are distributed in a second rectangle, and two symmetry lines of the second rectangle are parallel to the first reference line S5 and the second reference line S6, respectively.

It can be understood that, according to actual conditions, the number of the first pulley 331 is not limited to four, and the number of the second pulley 332 is not limited to four.

For example, the number of the first pulley 331 is two, three or more than three, the number of the second pulley 332 is two, three or more than three, as long as the sum of the number of the first pulley 331 and the second pulley 332 is at least three.

In some embodiments, the manipulator 33 includes a first clamping portion and a second clamping portion, and the first clamping portion may be relatively close to or far away from the second clamping portion, so that the first clamping portion and the second holding part can clamp goods or loosen goods.

The positioning component 34 is used for detecting a position of the transportation apparatus 30 relative to the storage shelf 20, and the positioning component 34 includes a first camera apparatus 340 and a second camera apparatus 341. Where, an orientation of a lens of the first camera apparatus 340 is along a first direction of the second reference line S6, and an orientation of a lens of the second camera apparatus 341 is along a second direction of the second reference line S6, where the first direction is opposite to the second direction.

The first camera apparatus 340 is fixedly mounted to the first upper fork 351, and the second camera apparatus 341 is fixedly mounted to the second lower fork 360.

The lifting component 40 is mounted to the vertical bracket 111, and the lifting component 40 is connected to the bracket 31. The lifting component 40 is used for driving the transportation apparatus 30 to move along the vertical direction relative to the storage shelf 20.

When the lifting component 40 drives the manipulator 33 to move to a corresponding storage pallet 23 along the vertical direction relative to the storage shelf 20, the manipulator 33 can load goods to or unload goods from a corresponding storage pallet.

Please refer to FIG. 5 again, the lifting component 40 includes a lifting transmission mechanism 41 and a lifting driving mechanism 42. Where, the lifting driving mechanism 41 is connected to the lifting transmission mechanism 42, the lifting transmission mechanism 42 is connected to the bracket 31, and the lifting driving mechanism 42 is used for driving, by the lifting transmission mechanism 41, the bracket 31 to move along the vertical direction relative to the storage shelf 20.

The lifting transmission mechanism 41 includes a lifting driving synchronous pulley 410, a lifting tensioning synchronous pulley 411, and a lifting synchronous belt 412. Where, the lifting synchronous belt 412 is simultaneously sleeved on the lifting driving synchronous pulley 410 and the lifting tensioning synchronous pulley 411.

The lifting driving synchronous pulley 410 is connected to the lifting driving mechanism 42, the lifting synchronous belt 412 is fixedly mounted with the bracket 31, and the lifting driving mechanism 42 is used for driving the lifting driving synchronous pulley 410 to rotate, the lifting driving synchronous pulley 410 drives the lifting synchronous belt 412 to move along the vertical direction relative to the storage shelf 20, so that the bracket 31 moves along the vertical direction relative to the storage shelf 20.

It can be understood that, according to actual conditions, the lifting driving mechanism 42 is not limited to the lifting driving synchronous pulley 410, the lifting tensioning synchronous pulley 411, and the lifting synchronous belt 412. For example, the lifting driving mechanism 42 may also be a worm gear mechanism, a gear set, or the like.

Two sets of lifting driving mechanisms 42 are respectively mounted to opposite surfaces of the two vertical columns 115.

The lifting driving mechanism 43 includes a lifting driving apparatus 430, a driving gear set 431, and a transmission shaft 432. The driving gear set 341 is connected between the transmission shaft 432 and the lifting driving apparatus 430.

The lifting driving apparatus 430 is used for driving, by the driving gear set 431, the transmission shaft 432 to rotate, so as to drive the two lifting driving synchronous pulleys 410 respectively mounted to two ends of the transmission shaft 432 to rotate.

In this embodiment, the lifting driving apparatus 430 is a third motor.

It can be understood that, according to actual conditions, the lifting driving apparatus 430 may also be a hydraulic power system, a pneumatic motor, or the like.

When the transportation robot 100 is specifically used, details are as follows:

the transportation robot 100 moves to the fixed shelf through the mobile chassis 10, where the mobile chassis 10 moves along the preset path, the preset path is parallel to the first reference line S5, and the fixed shelf is located outside the preset path; the transportation robot 100 can reach an approximate range of the fixed shelf through the guiding apparatus 14, and then can reach a specific position through the positioning component 34.

When loading goods from the fixed shelf (the structure of the fixed shelf is similar to the structure of the storage shelf), the transportation apparatus 30 is first driven by the lifting component 40 to move along the vertical direction, so that the temporary storage pallet 330 of the transportation apparatus 30 is located at a height slightly lower the goods. Then, the telescopic apparatus 32 drives the temporary storage pallet 330 to move along the first reference line S5 or the second reference line S6, so that the temporary storage pallet 330 is located directly below the goods, and the lifting component 40 drives the temporary storage pallet 330 to rise along the vertical direction to lift the goods, so that the goods are placed on the temporary storage pallet 330. And then, the telescopic apparatus 32 drives the temporary storage pallet 330 to move along the first reference line S5 or the second reference line S6, and the temporary storage pallet 330 is located directly above one storage pallet 23 through the lifting component 40, and then, the temporary storage pallet 330 descends along the vertical direction and passes through a gap 231 of a corresponding storage pallet 23, so that the goods are separated from the temporary storage pallet 330, and the goods are supported on the two supporting portions 230 of a corresponding storage pallet 23.

When unloading goods to the fixed shelf, first, the transportation apparatus 30 is first driven to move along the vertical direction through the lifting component 40, so that the temporary storage pallet 330 of the transportation apparatus 30 is located at a height slightly lower the storage pallet 23 where the goods are placed, and then the telescopic apparatus 32 drives the temporary storage pallet 330 to move along the first reference line S5 or the second reference line S6, so that the temporary storage pallet 330 is located directly below a corresponding storage pallet 23, and the temporary storage pallet 330 is driven to rise along the vertical direction through the lifting component 40, passes through a gap of a corresponding storage pallet 23 and lifts the goods, so as to enable the goods to be placed on the temporary storage pallet 330. And then, the telescopic apparatus 32 drives the temporary storage pallet 330 to move along the first reference line S5 or the second reference line S6, and the temporary storage pallet 330 is located directly above an empty position of the fixed shelf through the lifting component 40, and then, the temporary storage pallet 330 descends along the vertical direction, so as to separate the goods from the temporary storage pallet 330, and the goods are on the empty position of the fixed shelf.

Compared with the prior art, in the transportation robot 100 provided in the embodiments of the present application, the transportation robot 100 includes: the mobile chassis 10; the storage shelf 20 mounted to the mobile chassis 10, and the storage shelf 20 is used for placing goods; the transportation apparatus 30 includes the bracket 31, the telescopic apparatus 32 and the manipulator 33, the bracket 31 is mounted to the storage shelf 20, the telescopic apparatus 32 is mounted to the bracket 31, the manipulator 33 is mounted to the telescopic apparatus 32, and the telescopic apparatus 32 is used for driving the manipulator 33 to move along the horizontal first reference line S5 or the horizontal second reference line S6 relative to the storage shelf 20, so that the manipulator 33 can load or unload the goods at any position on the first reference line S5 or the second reference line S6; the first reference line S5 and the second reference line S6 are set at the preset angle. With the above arrangement, the transportation robot 100 is equipped with the storage shelf 20 for placing a number of goods, so that the transportation robot 100 can load a large number of goods.

The above content are only embodiments of the present application, and do not limit the scope of the present application. Any equivalent structure or equivalent process transformation made using the contents of the description and drawings of the present application, or direct or indirect applications in other related technical fields, are all included in the scope of patent protection of the present application.

What is claimed is:

1. A transportation apparatus (30), comprising a bracket (31), a telescopic apparatus (32) and a manipulator (33), wherein the telescopic apparatus (32) is mounted to the bracket (31), the manipulator (33) is mounted to the telescopic apparatus (32), and the telescopic apparatus (32) is used for driving the manipulator (33) to move along a horizontal first reference line (S5) or a horizontal second reference line (S6); and the first reference line (S5) and the second reference line (S6) are set at a preset angle;

wherein the telescopic apparatus (32) comprises a first telescopic arm (35) and a second telescopic arm (36);

one end of the first telescopic arm (35) is mounted to the bracket (31), one end of the second telescopic arm (36) is mounted to the other end of the first telescopic arm (35);

the other end of the first telescopic arm (35) is configured to move along the first reference line (S5) relative to the bracket (31), and the other end of the second telescopic arm (36) is configured to move along the second reference line (S6) relative to the first telescopic arm (35); and when the first telescopic arm (35) and the second telescopic arm (36) are retracted, the second telescopic arm (36) is disposed above the first telescopic arm (35) along a direction perpendicular to the first reference line (S5) and the second reference line (S6).

2. The transportation apparatus (30) according to claim 1, wherein the manipulator (33) is mounted to the other end of the second telescopic arm (36).

3. The transportation apparatus (30) according to claim 2, wherein the first telescopic arm (35) comprises a first lower fork component (350), a first upper fork component (351) and a first telescopic driving component (352);

the first lower fork component (350) is fixedly mounted to the bracket (31), and a surface of the first lower fork component (350) facing away from the bracket (31) is provided with a first guide rail (3540) for guiding along the first reference line (S5);

the first upper fork (351) is mounted to the first guide rail (3540); and the first telescopic driving component (352) is connected the first upper fork (351) and the first lower fork component (350), and the first telescopic driving component (352) is used for driving the first upper fork (351) to move along the first reference line (S5) relative to the first lower fork component (350).

4. The transportation apparatus (30) according to claim 3, wherein the first telescopic driving component (352) comprises a lead screw (3560), a moving block (3561) and a first telescopic driving apparatus (3573);

the lead screw (3560) is mounted to the first upper fork (351), the moving block (3561) is fixedly mounted to the first lower fork component (350), and the moving block (3561) is threadedly connected to the lead screw (3560), and the first telescopic driving apparatus (3573) is connected to the lead screw (3560);

a center line of the lead screw (3560) is disposed parallel to the first reference line (S5); and the first telescopic driving apparatus (3573) is used for driving the lead screw (3560) to rotate around the center line relative to the first upper fork (351), so that the moving block (3561) moves along the first reference line (S5) relative to the first upper fork (351).

5. The transportation apparatus (30) according to claim 3, wherein the first telescopic driving component (356) comprises a synchronous belt (3562), a synchronous drive pulley (3563), a synchronous belt tensioning pulley (3564), and a first telescopic driving apparatus (3573);

both the synchronous drive pulley (3563) and the synchronous belt tensioning pulley (3564) are mounted to the first upper fork (351), the synchronous belt (3562) is simultaneously sleeved on the synchronous drive pulley (3563) and the synchronous belt tensioning pulley (3564), and the first lower fork component (350) is fixedly connected to the synchronous belt (3562), and the first telescopic driving apparatus (3573) is connected to the synchronous drive pulley (3563); and the first telescopic driving apparatus (3573) is used for driving the synchronous drive pulley (3563) to rotate, so that the synchronous belt (3562) drives the first lower fork component (350) to move along the first reference line (S5) relative to the first upper fork (351).

6. The transportation apparatus (30) according to claim 3, wherein the first lower fork component (350) comprises a first lower fork (353), a first middle fork (354) and a second telescopic driving component (355);

the first lower fork (353) is fixedly mounted to the first upper fork (351), and a surface of the first lower fork (353) facing away from the first upper fork (351) is provided with a second guide rail (3530) for guiding along the first reference line (S5);

the first middle fork (354) is mounted to the second guide rail (3530), and a surface of the first middle fork (354) facing away from the first lower fork (353) is provided with the first guide rail (3540); and the second telescopic driving component (355) is connected to the first middle fork (354) and the first lower fork (353), and is used for driving the first lower fork (353) to move along the first reference line (S5) relative to the first middle fork (354).

7. The transportation apparatus (30) according to claim 6, wherein the second telescopic driving component (355) comprises a movable pulley (3550) and a strop (3551);

the movable pulley (3550) is mounted to the first middle fork (354), and a middle part of the strop (3551) is bent and sleeved on the movable pulley (3550), so that two ends of the strop (3551) are disposed oppositely to each other;

one end of the strop (3551) is fixedly mounted to the first lower fork (353), the other end of the strop (3551) is fixedly mounted to the first upper fork (351); and when the first middle fork (354) moves along the first reference line (S5) relative to the first lower fork (353) at a first speed, the first upper fork (351) moves along the first reference line (S5) relative to the first lower fork (353) at a second speed, and the second speed is twice the first speed.

8. The transportation apparatus (30) according to claim 7, wherein the movable pulley (3550) is a flat belt pulley, and the strop (3551) is an open-loop flat belt.

9. The transportation apparatus (30) according to claim 1, wherein the first reference line (S5) and the second reference line (S6) are disposed orthogonally.

10. The transportation apparatus (30) according to claim 1, wherein the manipulator (33) comprises a temporary storage pallet (330); and the temporary storage pallet (330) is used for placing goods.

11. A transportation robot (100), comprising the transportation apparatus (30) according to claim 1.

12. The transportation robot (100) according to claim 11, wherein the transportation robot (100) further comprises a mobile chassis (10) and a storage shelf (20); and the storage shelf (20) is mounted to the mobile chassis (10), and the storage shelf (20) is used for placing a number of goods.

13. The transportation robot (100) according to claim 12, wherein the transportation robot (100) further comprises a lifting component (40);

the lifting component (40) is mounted to the storage shelf (20), and the lifting component (40) is connected to the bracket (31) of the transportation apparatus (30); and the lifting component (40) is used for driving the transportation apparatus (30) to move along a vertical direction relative to the storage shelf (20).

14. The transportation robot (100) according to claim 13, wherein the storage shelf (20) comprises a plurality of storage pallets (23) distributed along the vertical direction; each storage pallet (23) is used for placing goods; and when the lifting component (40) drives the manipulator (33) to move, relative to the storage shelf (20), to a corresponding storage pallet (23) along the vertical direction, the manipulator (33) loads goods to or unloads goods from the corresponding storage pallet (23).

15. The transportation robot (100) according to claim 14, wherein the manipulator (33) comprises a temporary storage pallet (330);

the temporary storage pallet (330) is used for placing goods;

each storage pallet (23) comprises two supporting portions (230);

the two supporting portions (230) are together used for supporting the goods, the two supporting portions (230) are provided with a gap (231), and the gap (231) is configured to allow the temporary storage pallet (330) to pass through it along the vertical direction;

when the temporary storage pallet (330) on which the goods are placed descends along the vertical direction and passes through the gap (231), the goods is separated from the temporary storage pallet (330) and supported on the two supports portions (230); and when the temporary storage pallet (330) rises along the vertical direction and passes through the gap (231) between the two supporting portions (230) on which the goods are placed, the goods are separated from corresponding two supporting portions (230) and supported on the temporary storage pallet (330).

16. A transportation apparatus (30), comprising a bracket (31), a telescopic apparatus (32) and a manipulator (33), wherein the telescopic apparatus (32) is mounted to the bracket (31), the manipulator (33) is mounted to the telescopic apparatus (32), and the telescopic apparatus (32) is used for driving the manipulator (33) to move along a horizontal first reference line (S5) or a horizontal second reference line (S6); and the first reference line (S5) and the second reference line (S6) are set at a preset angle;

wherein the telescopic apparatus (32) comprises a first telescopic arm (35) and a second telescopic arm (36);

the first telescopic arm (35) comprises a first lower fork (353) and a first upper fork (351); the first lower fork (353) is fixedly mounted to the bracket (31), and comprises a first end (381) and a second end (382) opposite to each other along the first reference line (S5);

the first upper fork (351) is configured to move along the first reference line (S5) relative to the first lower fork (353);

the second telescopic arm (36) comprises a second lower fork (360) and a second upper fork (362); the second lower fork (360) is fixedly mounted to the first upper fork (351), and the second upper fork (362) is configured to move along the second reference line (S6) relative to the second lower fork (360); and when the first telescopic arm (35) and the second telescopic arm (36) are retracted, the second lower fork (360) is disposed between and above the first end (381) and the second end (382) of the first lower fork (353).

17. A transportation apparatus (30), comprising a bracket (31), a telescopic apparatus (32) and a manipulator (33), wherein the telescopic apparatus (32) is mounted to the bracket (31), the manipulator (33) is mounted to the telescopic apparatus (32), and the telescopic apparatus (32) is used for driving the manipulator (33) to move along a horizontal first reference line (S5) or a horizontal second reference line (S6); and the first reference line (S5) and the second reference line (S6) are set at a preset angle;

wherein the telescopic apparatus (32) comprises a first telescopic arm (35) and a second telescopic arm (36);

one end of the first telescopic arm (35) is mounted to the bracket (31), one end of the second telescopic arm (36) is mounted to the other end of the first telescopic arm (35), and the manipulator (33) is mounted to the other end of the second telescopic arm (36);

one end of the first telescopic arm (35) moves along the first reference line (S5) relative to the other end of the first telescopic arm (35); and one end of the second telescopic arm (36) moves along the second reference line (S6) relative to the other end of the second telescopic arm (36);

wherein the first telescopic arm (35) comprises a first lower fork component (350), a first upper fork (351) and a first telescopic driving component (352);

the first lower fork component (350) is fixedly mounted to the bracket (31), and a surface of the first lower fork component (350) facing away from the bracket (31) is provided with a first guide rail (3540) for guiding along the first reference line (S5);

the first upper fork (351) is mounted to the first guide rail (3540); and the first telescopic driving component (352) is connected the first upper fork (351) and the first lower fork component (350), and the first telescopic driving component (352) is used for driving the first upper fork (351) to move along the first reference line (S5) relative to the first lower fork component (350);

wherein the first lower fork component (350) comprises a first lower fork (353), a first middle fork (354) and a second telescopic driving component (355);

the first lower fork (353) is fixedly mounted to the first upper fork (351), and a surface of the first lower fork (353) facing away from the first upper fork (351) is provided with a second guide rail (3530) for guiding along the first reference line (S5);

the first middle fork (354) is mounted to the second guide rail (3530), and a surface of the first middle fork (354) facing away from the first lower fork (353) is provided with the first guide rail (3540); and the second telescopic driving component (355) is connected to the first middle fork (354) and the first lower fork (353), and is used for driving the first lower fork (353) to move along the first reference line (S5) relative to the first middle fork (354);

wherein the second telescopic driving component (355) comprises a movable pulley (3550) and a strop (3551);

the movable pulley (3550) is mounted to the first middle fork (354), and a middle part of the strop (3551) is bent and sleeved on the movable pulley (3550), so that two ends of the strop (3551) are disposed oppositely to each other;

one end of the strop (3551) is fixedly mounted to the first lower fork (353), the other end of the strop (3551) is fixedly mounted to the first upper fork (351); and when the first middle fork (354) moves along the first reference line (S5) relative to the first lower fork (353) at a first speed, the first upper fork (351) moves along the first reference line (S5) relative to the first lower fork (353) at a second speed, and the second speed is twice the first speed.

* * * * *